United States Patent
Ishihara et al.

(10) Patent No.: US 12,459,243 B2
(45) Date of Patent: Nov. 4, 2025

(54) THERMAL CONDUCTIVE COMPOSITE SILICONE RUBBER SHEET

(71) Applicant: SHIN-ETSU CHEMICAL CO., LTD., Tokyo (JP)

(72) Inventors: Yasuhisa Ishihara, Annaka (JP); Akihiro Endo, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 667 days.

(21) Appl. No.: 17/617,772

(22) PCT Filed: Apr. 15, 2020

(86) PCT No.: PCT/JP2020/016573
§ 371 (c)(1),
(2) Date: Dec. 9, 2021

(87) PCT Pub. No.: WO2020/255549
PCT Pub. Date: Dec. 24, 2020

(65) Prior Publication Data
US 2022/0234335 A1    Jul. 28, 2022

(30) Foreign Application Priority Data
Jun. 19, 2019  (JP) ................................ 2019-113297

(51) Int. Cl.
| | | |
|---|---|---|
| B32B 25/08 | (2006.01) | |
| B32B 5/02 | (2006.01) | |
| B32B 7/027 | (2019.01) | |
| B32B 7/12 | (2006.01) | |
| B32B 25/10 | (2006.01) | |
| B32B 25/20 | (2006.01) | |
| B32B 27/28 | (2006.01) | |
| C08K 3/22 | (2006.01) | |
| C08K 7/18 | (2006.01) | |
| C09J 7/25 | (2018.01) | |
| C09J 7/38 | (2018.01) | |

(52) U.S. Cl.
CPC ............... *B32B 25/08* (2013.01); *B32B 5/02* (2013.01); *B32B 7/027* (2019.01); *B32B 7/12* (2013.01); *B32B 25/10* (2013.01); *B32B 25/20* (2013.01); *B32B 27/283* (2013.01); *C09J 7/25* (2018.01); *C09J 7/38* (2018.01); *B32B 2262/101* (2013.01); *B32B 2307/302* (2013.01); *B32B 2307/732* (2013.01); *C08K 2003/2227* (2013.01); *C08K 7/18* (2013.01); *C09J 2483/006* (2013.01)

(58) Field of Classification Search
None
See application file for complete search history.

(56) References Cited

U.S. PATENT DOCUMENTS

| | | |
|---|---|---|
| 7,279,224 B2 | 10/2007 | Aoki et al. |
| 2002/0011660 A1 | 1/2002 | Ebihara et al. |
| 2004/0043229 A1 | 3/2004 | Aoki et al. |
| 2007/0254137 A1 | 11/2007 | Koppe et al. |
| 2019/0316018 A1 | 10/2019 | Ito et al. |
| 2022/0080718 A1* | 3/2022 | Kubo .................. H01L 23/3737 |

FOREIGN PATENT DOCUMENTS

| | | | |
|---|---|---|---|
| CN | 1495245 A | 5/2004 | |
| JP | H10-321887 A | 12/1998 | |
| JP | 2001212909 A | * 8/2001 | ............. B32B 25/08 |
| JP | 2001-348542 A | 12/2001 | |
| JP | 2004-090516 A | 3/2004 | |
| JP | 2004-311577 A | 11/2004 | |
| JP | 2012-106409 A | 6/2012 | |
| JP | 2013-086433 A | 5/2013 | |
| JP | 2014-138132 A | 7/2014 | |
| JP | 2014-193598 A | 10/2014 | |
| JP | 2018-193491 A | 12/2018 | |
| WO | 2014/196347 A1 | 12/2014 | |
| WO | 2018/070351 A1 | 4/2018 | |

OTHER PUBLICATIONS

Tanahashi et al., JP 2001212909, Aug. 7, 2001 (machine translation) (Year: 2001).*
Database WPI Week 201901 Thomson Scientific, London, GB; AN 2018-967367 XP-002810319 & JP2018-193491A.
Database WPI Week 200477 Thomson Scientific, London, GB; AN 2004-779124 XP-002810320 & JP2004-311577A.
Database WPI Week 201334 Thomson Scientific, London, GB; AN 2013-H08162 XP-002810321 & JP2013-086433A.
Database WPI Week 201501 Thomson Scientific, London, GB; AN 2014-W25080 XP-002810322 & WO2014196347A1.
Oct. 30, 2023 extended Search Report issued in European Patent Application No. 20826997.7.

(Continued)

*Primary Examiner* — Cheng Yuan Huang
(74) *Attorney, Agent, or Firm* — Oliff PLC

(57) ABSTRACT

A thermal conductive composite silicone rubber sheet includes a thermal conductive silicone rubber sheet and a thermosoftening silicone resin layer with a thickness of 0.5 to 10 μm on one side of the thermal conductive silicone rubber sheet, the thermosoftening silicone resin layer having an viscosity at 70° C. of 700 Pa·s or lower, where the thermosoftening silicone resin layer has adhesion of 0.5 N/25 mm or higher at a normal temperature and the thermal conductive composite silicone rubber sheet has a thermal resistance lower than a value obtained by adding 0.3 cm2·K/W per one layer of one side of the thermosoftening silicone resin layer to a thermal resistance of the thermal conductive silicone rubber sheet. A thermal conductive composite silicone rubber sheet provided with an adhesive layer on one side of a thermal conductive silicone rubber sheet, makes it possible to impart adhesion without sacrificing thermal conductivity.

9 Claims, No Drawings

(56) References Cited

OTHER PUBLICATIONS

Jul. 14, 2020 International Search Report issued in International Patent Application No. PCT/JP2020/016573.
Mar. 21, 2024 Office Action issued in Chinese Patent Application No. 202080044024.0, with partial English translation.
Oct. 31, 2024 Office Action issued in Korean Patent Application No. 10-2021-7041214.

* cited by examiner

THERMAL CONDUCTIVE COMPOSITE SILICONE RUBBER SHEET

TECHNICAL FIELD

The present invention relates to a thermal conductive composite silicone rubber sheet which is, for example, disposed between a heat-generating component and a heat-dissipating component in an electronic device, and used for heat dissipation.

BACKGROUND ART

Semiconductors such as transistors and diodes used in electronic equipment such as converters and power sources have come to generate a larger amount of heat by itself accompanying an advance in high performance, high speed, miniaturization, and high integration, and a temperature rise of equipment due to the heat causes malfunction and breakdown of the equipment. Therefore, in order to suppress a temperature rise of the semiconductor during operation, many heat dissipation methods and heat-dissipating members used for the methods have been proposed.

Recently, in electronic equipment and the like, heat sinks that employ a metal plate having a high thermal conductivity, such as one made of aluminum or copper, have been used to hold down the rise in semiconductor temperature during operation. Such a heat sink carries away heat generated by the semiconductors and discharges the heat from a surface by way of the temperature difference with outside air.

The semiconductor and the heat sink need to be electrically insulated, and a plastic film or the like has been interposed until now. However, a plastic film has an extremely low thermal conductivity, and therefore, greatly inhibits the conduction of heat to the heat sink. Accordingly, as a countermeasure, it is known that insulation and thermal conductivity can both be achieved by using a thermal conductive silicone rubber sheet imparted with thermal conductivity by filling a polymer such as silicone with a heat conductive filler.

In addition, when mounting a thermal conductive silicone rubber sheet between a heat-generating member, such as a semiconductor, and a cooling plate, such as a heat sink, the thermal conductive silicone rubber sheet is fastened with a screw, a spring clip, or the like. However, adhesiveness is required in at least one side of the thermal conductive silicone rubber sheet due to a matter of the process when mounting. This is because it is necessary to adjust the mounting position of the thermal conductive silicone rubber sheet when mounting. If there is no adhesive layer, there is a possibility that the thermal conductive silicone rubber sheet will shift from the desired mounting position when fixing the thermal conductive silicone rubber sheet. In addition, the thermal conductive silicone rubber sheet sometimes needs to be stuck vertically due to circumstances concerning the mounting process.

Providing a thermal conductive silicone rubber sheet with an adhesive layer is a known technique, and the matter concerning adhesiveness in a mounting process has been resolved by providing the adhesive layer (Patent Documents 1, 2, 3, and 4). However, the adhesive layer provided to the thermal conductive silicone rubber sheet used until now has a thickness of about 10 to 50 μm, and thermal conductivity is remarkably degraded due to the thickness of the adhesive layer being thick. If the thickness of the adhesive layer is made thin in an attempt to improve thermal conductivity, thermal conductivity will certainly be improved, but adhesion will be degraded. It is also possible to consider providing the adhesive layer itself with thermal conductivity, but it is necessary to add a heat conductive filler in order to provide the adhesive layer with thermal conductivity, and this also causes the degradation of adhesion. Accordingly, to ensure adhesion, it is possible to consider making the thickness of the adhesive layer thicker. However, if the thickness of the adhesive layer is made thicker, thermal conductivity becomes sacrificed. In this manner, adhesion and thermal conductivity go against one another, and a method for providing adhesion while sacrificing thermal conductivity as little as possible has been required for many years.

CITATION LIST

Patent Literature

Patent Document 1: JP 2001-348542 A
Patent Document 2: JP 2014-193598 A
Patent Document 3: JP 2018-193491 A
Patent Document 4: Japanese Patent Application No. 2018-544987

SUMMARY OF INVENTION

Technical Problem

The present invention has been made in view of such circumstances, and an object thereof is to provide a thermal conductive composite silicone rubber sheet provided with an adhesive layer on at least one side of a thermal conductive silicone rubber sheet, that makes it possible to impart adhesion without sacrificing thermal conductivity as much as possible.

Solution to Problem

To achieve the above-described object, the present invention provides a thermal conductive composite silicone rubber sheet comprising a thermal conductive silicone rubber sheet and a thermosoftening silicone resin layer provided with a thickness of 0.5 to 10 μm on at least one side of the thermal conductive silicone rubber sheet, the thermosoftening silicone resin layer having an absolute viscosity at 70° C. of 700 Pa·s or lower, wherein the thermosoftening silicone resin layer has adhesion of 0.5 N/25 mm or higher at a normal temperature and the thermal conductive composite silicone rubber sheet has a thermal resistance that is lower than a value obtained by adding 0.3 cm$^2$·K/W per one layer of one side of the thermosoftening silicone resin layer provided on at least one side of the thermal conductive silicone rubber sheet to a thermal resistance of the thermal conductive silicone rubber sheet.

When the inventive thermal conductive composite silicone rubber sheet is mounted in the interface between a heat-generating member and a cooling member, the thermosoftening silicone resin layer is softened by the heat from the heat-generating member and gains flowability, so that contact with the adherend is improved and thermal conductivity is raised. Therefore, thermal conductivity and adhesion can both be imparted sufficiently.

In this event, after keeping the thermal conductive composite silicone rubber sheet in storage in an environment of 60° C. for two months, the thermosoftening silicone resin layer preferably has adhesion of 70% or more of the adhesion before the storage.

With such a thermal conductive composite silicone rubber sheet, the difference in adhesion from an early stage in production does not become too large, and conditions such as the load required for adhesion in the mounting process do not change greatly, so that there is no risk of production efficiency being degraded.

Furthermore, in this event, the thermal conductive silicone rubber sheet preferably has a silicone rubber component comprising a dimethylsiloxane unit, and the thermosoftening silicone resin layer preferably has a phenyl modification rate or 20 mol % or higher.

With such a thermal conductive composite silicone rubber sheet, the silicone rubber component of the thermal conductive silicone rubber sheet and a resin component of the thermosoftening silicone resin layer do not become too compatible. Therefore, it is possible to suppress the degradation of adhesion during storage due to the resin component of the thermosoftening silicone resin layer dispersing in the thermal conductive silicone rubber sheet.

Furthermore, in this event, the thermal conductive silicone rubber sheet preferably comprises a glass cloth and/or a plastic film.

When a glass cloth is contained, the thermal conductive composite silicone rubber sheet becomes excellent in strength. Meanwhile, when a plastic film is contained, the thermal conductive composite silicone rubber sheet becomes more excellent in electrical insulation.

Advantageous Effects of Invention

When the inventive thermal conductive composite silicone rubber sheet is mounted in the interface between a heat-generating member and a cooling member, the thermosoftening silicone resin layer is softened by the heat from the heat-generating member and gains flowability, so that contact with the adherend is improved and thermal conductivity is raised. Therefore, thermal conductivity and adhesion can both be imparted sufficiently.

DESCRIPTION OF EMBODIMENTS

Hereinafter, the present invention will be described in detail, but the present invention is not limited thereto.

The present invention is a thermal conductive composite silicone rubber sheet comprising a thermal conductive silicone rubber sheet and a thermosoftening silicone resin layer provided with a thickness of 0.5 to 10 μm on at least one side of the thermal conductive silicone rubber sheet, the thermosoftening silicone resin layer having an absolute viscosity at 70° C. of 700 Pa·s or lower, wherein the thermosoftening silicone resin layer has adhesion of 0.5 N/25 mm or higher at a normal temperature and the thermal conductive composite silicone rubber sheet has a thermal resistance that is lower than a value obtained by adding 0.3 cm$^2$·K/W per one layer of one side of the thermosoftening silicone resin layer provided on at least one side of the thermal conductive silicone rubber sheet to a thermal resistance of the thermal conductive silicone rubber sheet.

The inventive thermal conductive composite silicone rubber sheet has a thermal conductive silicone rubber sheet and a thermosoftening silicone resin layer provided on at least one side of the thermal conductive silicone rubber sheet. The thermosoftening silicone resin layer can be provided on at least one side of the thermal conductive silicone rubber sheet, and can also be provided on both sides.

[Thermal Conductive Silicone Rubber Sheet]

The thermal conductive silicone rubber sheet is, for example, obtained by adding a heat conductive filler, curing agent, and the like to a silicone polymer, kneading the thermal conductive silicone composition, forming the resultant into a sheet form by any method, and curing.

The kneading is preferably carried out by a kneading means having a shearing force such as a planetary mixer, a kneader, and a two-rod roll, but is not particularly limited thereto. Methods for forming the thermal conductive silicone composition into a sheet form include calendering, coating, extrusion, etc., but are not particularly limited.

The thermal conductivity of the thermal conductive silicone rubber sheet is preferably 0.8 W/mK or higher, further preferably 1.2 W/mK or higher. When the thermal conductivity is 0.8 W/mK or higher, the heat of the heat-generating member can be sufficiently conducted to the cooling portion. There is no particular upper limit to the thermal conductivity, and as long as the formation into a sheet form is possible, a higher thermal conductivity is preferable, since heat from the heat-generating member can be conducted to the cooling portion more efficiently.

The thickness of the thermal conductive silicone rubber sheet is preferably 0.08 mm or more and 1.2 mm or less. When the thickness is 0.08 mm or more, sufficient insulation can be ensured. Meanwhile, when the thickness is 1.2 mm or less, the heat from the heat-generating member can be conveyed sufficiently to the cooling portion while also ensuring high insulation.

The hardness of the thermal conductive silicone rubber sheet is preferably 60 or higher and 98 or lower by Shore A hardness. With a Shore A hardness of 60 or higher, it is possible to suppress insulation from becoming unstable due to the thickness being changed by the fixing pressure of a screw or clip when mounting the thermal conductive composite silicone rubber sheet. Meanwhile, with a Shore A hardness of 98 or lower, the thermal conductive composite silicone rubber sheet does not become too hard.

The thermal conductive silicone rubber sheet may contain a glass cloth and/or a plastic film. For example, materials such as a glass cloth with the aim of achieving a reinforcement effect, and a plastic film with the aim of achieving an insulating effect can be contained. For example, the thermal conductive silicone rubber sheet can include two silicone rubber layers and a middle layer interposed between the two, and the above materials can be contained as the middle layer.

As the thermal conductive silicone rubber sheet, various products are already commercially available, and examples include TC-20CG (manufactured by Shin-Etsu Chemical Co., Ltd.), TC-30BG (manufactured by Shin-Etsu Chemical Co., Ltd.), TC-15TAP-2 (manufactured by Shin-Etsu Chemical Co., Ltd.), TC-20TAG-8 (manufactured by Shin-Etsu Chemical Co., Ltd.), TC-20TA-1 (manufactured by Shin-Etsu Chemical Co., Ltd.), TC-20TAG-2 (manufactured by Shin-Etsu Chemical Co., Ltd.), TC-20TAP-2 (manufactured by Shin-Etsu Chemical Co., Ltd.), etc. These are only examples, and the thermal conductive silicone rubber sheet is not limited thereto.

[Thermosoftening Silicone Resin Layer]

The thermosoftening silicone resin layer contains a thermosoftening silicone resin. Thermosoftening means to be solid at a normal temperature, but to become fluid when heated. That is, when a thermal conductive composite silicone rubber sheet having a thermosoftening silicone resin layer laminated as an adhesive layer on a thermal conductive silicone rubber sheet is mounted on the interface between a heat-generating member and a cooling member, the thermosoftening silicone resin layer is softened by the heat from the heat-generating member and gains flowability, so that contact with the adherend is improved, and thermal conductivity becomes high.

The absolute viscosity of the thermosoftening silicone resin layer at 70° C. is 700 Pa·s or lower, preferably 300 Pa·s or higher and 700 Pa·s or lower. If the absolute viscosity is higher than 700 Pa·s, sufficient adhesion cannot be achieved at a normal temperature.

Absolute viscosity can be measured using HAAKE RotoVisco 1 (RotoVisco) rotational viscometer. Specifically, the sample silicone resin can be sandwiched between a flat disk (diameter: 20 mm), being the lower one of two disks each arranged horizontally at the top and bottom of a vertical central axis, and a cone-shaped disk (diameter: 20 mm, cone angle: 2 degrees, trunk: 0.1 mm) above, the flat disk can be fixed, and the cone-shaped disk can be rotated around the central axis at a rotational rate of $10\ s^{-1}$ with the central axis as the axis of rotation to measure absolute viscosity.

Specific examples of the thermosoftening silicone resin include those shown in the following formulae (1) to (3), but are not particularly limited thereto.

Examples include a silicone resin having a difunctional structural unit (D unit) and a trifunctional structural unit (T unit) in a certain composition as in the following formula (1).

$$D_m T^{\varphi}_p D^{Vi}_n \qquad (1)$$

Here, D represents a dimethylsiloxane unit (that is, $(CH_3)_2\ SiO$), $T^{\varphi}$ represents a phenyl siloxane unit (that is, $(C_6H_5)SiO_{3/2}$), $D^{Vi}$ represents a methylvinylsiloxane unit (that is, $(CH_3)\ (CH_2=CH)SiO$), ((m+n)/p (molar ratio)= 0.25 to 4.0, and (m+n)/m (molar ratio)=1.0 to 4.0.

In addition, examples include a silicone resin having a monofunctional structural unit (M unit), a difunctional structural unit (D unit), and a trifunctional structural unit (T unit) in a certain composition as in the following formula (2).

$$M_L D_m T^{\varphi}_p D^{Vi}_n \qquad (2)$$

Here, M represents a trimethylsiloxane unit (that is, $(CH_3)_3SiO_{1/2}$), D, $T^{\varphi}$, and $D^{Vi}$ are as defined above, (m+n)/p (molar ratio)=0.25 to 4.0, (m+n)/m (molar ratio)=1.0 to 4.0, and L/(m+n) (molar ratio)=0.001 to 0.1.

Furthermore, examples include a silicone resin having a monofunctional structural unit (M unit), a difunctional structural unit (D unit), and a tetrafunctional structural unit (Q unit) in a certain composition as in the following formula (3).

$$M_L D_m Q_q D^{Vi}_n \qquad (3)$$

Here, Q represents $SiO_{4/2}$, M, D, and $D^{Vi}$ are as defined above, (m+n)/q (molar ratio)=0.25 to 4.0, (m+n)/m (molar ratio)=1.0 to 4.0, and L/(m+n) (molar ratio)=0.001 to 0.1.

Furthermore, one kind of the thermosoftening silicone resin may be used, or two or more kinds may be used in mixture.

It is, of course, possible to add additives such as a plasticizer or a heat resistance improver as necessary.

[Thickness of Thermosoftening Silicone Resin Layer]

The thickness of the thermosoftening silicone resin layer is 0.5 to 10 μm, preferably 1 to 5 μm. If the thermosoftening silicone resin layer is thinner than 0.5 μm, sufficient adhesion cannot be achieved. Meanwhile, if the thermosoftening silicone resin layer is thicker than 10 μm, adhesion becomes high, but an increase in thermal resistance becomes great.

[Adhesion of Thermosoftening Silicone Resin Layer]

The adhesion of the thermosoftening silicone resin layer of the thermal conductive composite silicone rubber sheet is 0.5 N/25 mm or higher, preferably 0.7 N/25 mm or higher. If the adhesion is lower than 0.5 N/25 mm, the thermal conductive composite silicone rubber sheet goes out of position easily when adhered to the adherend for adjusting the position, and the thermal conductive composite silicone rubber sheet falls off in a short time when placed in a vertical state.

Note that adhesion can be measured by the following method.

In accordance with JIS C 2107, the adhesive layer side of the thermal conductive composite silicone rubber sheet with a width of 25 mm is stuck to a stainless steel plate, and left at 25° C. for 30 minutes. The sheet is then delaminated at a pulling rate of 300 ram/min at 180°. The release force on this occasion can be measured.

[Thermal Resistance of Thermal Conductive Composite Silicone Rubber Sheet]

The thermosoftening silicone resin layer is made so that the thermal conductive composite silicone rubber sheet has a thermal resistance that is lower than a value obtained by adding 0.3 $cm^2 \cdot K/W$ per one layer of one side of the thermosoftening silicone resin layer provided on at least one side of the thermal conductive silicone rubber sheet to a thermal resistance of the thermal conductive silicone rubber sheet. 0.15 $cm^2 \cdot K/W$ or lower per one layer of one side is preferable. With 0.3 $cm^2 \cdot K/W$ or higher, the thermal resistance of the thermal conductive composite silicone rubber sheet becomes too high compared with the thermal resistance of the thermal conductive silicone rubber sheet. The purpose of providing the thermosoftening silicone resin layer is to prevent the thermal conductive composite silicone rubber sheet from moving out of position when adjusting the position on mounting as described above. Therefore, the thermosoftening silicone resin layer becomes unnecessary after mounting, and ideally has as little effect on thermal resistance as possible. Note that thermal resistance can be a value measured using TIM-Tester (manufactured by Analysis Tech Inc.) in accordance with ASTMD6470 at a measurement temperature of 50° C. and a pressure of 100 psi.

[Adhesion after Keeping in Storage in Environment of 60° C. For Two Months]

The adhesion after keeping the thermal conductive composite silicone rubber sheet in storage in an environment of 60° C. for two months is preferably 70% or more of the initial adhesion (before storage), more preferably 80% or more. With 70% or more, the difference in adhesion from an early stage does not become too large, and conditions such as the load required for adhesion in the mounting process do not change greatly, so that there is no risk of production efficiency being degraded.

The silicone rubber component of the thermal conductive silicone rubber sheet preferably includes a dimethylsiloxane unit, and the resin component of the thermosoftening silicone resin layer preferably has a phenyl content of 20 mol % or higher. With 20 mol % or higher, the compatibility between the silicone rubber component of the thermal conductive silicone rubber sheet and the resin component of the thermosoftening silicone resin layer is not too high. Therefore, it is possible to suppress the degradation of adhesion during storage due to the resin component of the thermosoftening silicone resin layer dispersing in the thermal conductive silicone rubber sheet.

When such a thermal conductive composite silicone rubber sheet is mounted in the interface between a heat-generating member and a cooling member, the thermosoftening silicone resin layer is softened by the heat from the heat-generating member and gains flowability, so that contact with the adherend is improved and thermal conductivity is raised. Therefore, thermal conductivity and adhesion can both be imparted sufficiently.

EXAMPLE

Hereinafter, the present invention will be described more specifically with reference to Examples and Comparative Examples, but the present invention is not limited to the following Examples.

Examples 1 to 8

In Examples 1 to 8, one of the following thermosoftening silicone resin layers 1 to 3 was formed on only one side of one of the following thermal conductive silicone rubber sheets 1 to 4 to obtain a thermal conductive composite silicone rubber sheet. In this event, the thickness of each thermosoftening silicone resin layer was varied within the range of 0.5 to 10 μm. These are shown in Table 1.

Comparative Examples 1 to 9

In Comparative Examples 1 to 5, the following adhesive layer 1 or 2 was formed on only one side of one of the following thermal conductive silicone rubber sheets 1, 2, and 4. Meanwhile, in Comparative Example 6, the following resin layer 1 was formed on only one side of the following thermal conductive silicone rubber sheet 2. In Comparative Example 7, the following thermal conductive silicone resin layer 1 was formed on only one side of the following thermal conductive silicone rubber sheet 2. In Comparative Example 8, the following thermosoftening silicone resin layer 1 was formed with a thickness of 0.4 μm on only one side of the following thermal conductive silicone rubber sheet 2. In Comparative Example 9, the following thermosoftening silicone resin layer 2 was formed with a thickness of 11 μm on only one side of the following thermal conductive silicone rubber sheet 4.

The composite sheets of Comparative Examples 1 to 9 were obtained in this manner, and are shown in Table 2. Note that the thicknesses in Table 2 are the thicknesses of the adhesive layer, the thermosoftening resin layer, the thermal conductive silicone resin layer, and the thermosoftening silicone resin layer formed on the thermal conductive silicone rubber sheets.

[Thermal Conductive Silicone Rubber Sheet]
1. TC-20TA-1 (manufactured by Shin-Etsu Chemical Co., Ltd.) (thermal conductive silicone rubber sheet 1)
2. TC-20TAG-2 (manufactured by Shin-Etsu Chemical Co., Ltd.) (thermal conductive silicone rubber sheet 2)
3. TC-20TAG-8 (manufactured by Shin-Etsu Chemical Co., Ltd.) (thermal conductive silicone rubber sheet 3)
4. TC-20TAP-2 (manufactured by Shin-Etsu Chemical Co., Ltd.) (thermal conductive silicone rubber sheet 4)

[Thermosoftening Silicone Resin Layer]
Hereinafter, the structural units of the silicone in the formulae are the same as above, and M represents a trimethylsiloxane unit (that is, $(CH_3)_3SiO_{1/2}$), D represents a dimethylsiloxane unit (that is, $(CH_3)_2SiO$), $D^{Vi}$ represents a methylvinylsiloxane unit, $T^\varphi$ represents a phenyl siloxane unit (that is, $(C_6H_5)SiO_{3/2}$), and Q represents $SiO_{4/2}$.

1. Thermosoftening Silicone Resin Layer 1

An 85% xylene solution of the following formula (1) was applied to a thermal conductive silicone rubber sheet with a comma coater and dried at 80° C. for 10 minutes to form the layer with a predetermined thickness on the thermal conductive silicone rubber sheet.

$$D_m T^\varphi_p D^{Vi}_n \quad (1)$$

m=45, n=55, p=55
Absolute viscosity at 70° C.: 200 Pa·s

2. Thermosoftening Silicone Resin Layer 2

An 85% xylene solution of the following formula (2) was applied to a thermal conductive silicone rubber sheet with a comma coater and dried at 80° C. for 10 minutes to form the layer with a predetermined thickness on the thermal conductive silicone rubber sheet.

$$M_L D_m T^\varphi_p D^{Vi}_n \quad (2)$$

L=20, m=25, n=50, p=55
Absolute viscosity at 70° C.: 300 Pa·s

3. Thermosoftening Silicone Resin Layer 3

An 85% xylene solution of the following formula (3) was applied to a thermal conductive silicone rubber sheet with a comma coater and dried at 80° C. for 10 minutes to form the layer with a predetermined thickness on the thermal conductive silicone rubber sheet.

$$M_L D_m Q_q D^{Vi}_n \quad (3)$$

L=20, m=30, q=5, n=20,
Absolute viscosity at 70° C.: 700 Pa·s

[Adhesive Layer]
1. Adhesive Layer 1 (Addition-Curable Adhesive Layer)
(A-1) 100 parts of a linear organopolysiloxane having an alkenyl group and containing 5 mol % of phenyl groups (alkenyl group content: 0.006 mol/100 g, viscosity: 5000 Pa·s (25° C.)),
(B-1) 1.6 parts of an organohydrogenpolysiloxane shown by the following formula (4),

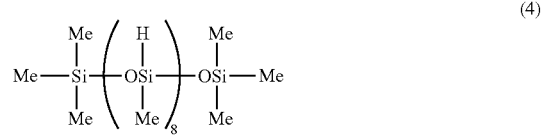

(4)

(C-1) 0.6 parts of a 2-ethyl hexanol solution of 5% chloroplatinic acid,
(D-1) 0.2 parts of ethynyl methylidene carbinol, and
(E-1) 100 parts of a xylene solution of an MQ silicone resin (non-volatile content: 60%, M/Q=0.85 (molar ratio)), viscosity of the xylene solution: 500 cp.

Preparation method: the components (A-1), (D-1), and (E-1) were charged into a Shinagawa mixer and stirred for homogenization. Subsequently, the component (C-1) was added and stirred for homogenization, and the component (B-1) was further added and stirred for homogenization to obtain an adhesive layer 1 composition.

The adhesive layer 1 composition having the above-described components was applied to a thermal conductive silicone rubber sheet with a comma coater, dried at 80° C. for 10 minutes, and cured at 120° C. for 10 minutes to form an adhesive layer 1 with a predetermined thickness on the thermal conductive silicone rubber sheet.

2. Adhesive Layer 2 (Peroxide-Curable Adhesive Layer)
(A-2) 100 parts of KR101-10 (manufactured by Shin-Etsu Chemical Co., Ltd.), (B-2) 3 parts of NYPER BMT-K40 (manufactured by NOF Corporation), and
(C-3) 38 parts of toluene.

Preparation method: the components (A-2) to (C-3) were charged into a Shinagawa mixer and stirred to obtain an adhesive layer 2 composition. This was applied to a thermal conductive silicone rubber sheet by using a comma coater, dried at 80° C. for 10 minutes, and cured at 150° C. for 5 minutes to form an adhesive layer 2 with a predetermined thickness on the thermal conductive silicone rubber sheet.

[Resin Layer]
1. Resin Layer 1

An 85% xylene solution of the following formula (2) was applied to a thermal conductive silicone rubber sheet with a comma coater and dried at 80° C. for 10 minutes to form the layer with a predetermined thickness on the thermal conductive silicone rubber sheet.

$$M_L D_m T^{\varphi}_p D^{V_i}_n \quad (2)$$

L=17, m=6, n=8, p=35
Absolute viscosity at 70° C.: 1000 Pa·s

[Thermal Conductive Silicone Resin Layer]
1. Thermal Conductive Silicone Resin Layer 1

(A-3) (Thermosoftening resin layer 1 shown by the following formula (1))
100 parts of $$D_m T^{\varphi}_p D^{V_i}_n \quad (1)$$

m=45, n=55, p=55
xylene solution with an absolute viscosity at 70° C. of 200 Pa·s, and (B-3) 200 parts of spherical alumina with a central particle size of 2 μm as a heat conductive filler.

Preparation method: the components (A-3) and (B-3) were charged into a Shinagawa mixer and stirred to obtain a thermal conductive silicone resin composition 1. This was applied to a thermal conductive silicone rubber sheet by using a comma coater and dried at 80° C. for 10 minutes to form a thermal conductive silicone resin layer 1 with a predetermined thickness.

[Evaluation Method]
[Difference in Thermal Resistance]

The thermal resistance before forming each of the thermosoftening silicone resin layers, the adhesive layers 1 and 2, the resin layer, and the thermal conductive silicone resin layer of the thermosoftening composite silicone rubber sheets of Examples 1 to 8 and the composite sheets of Comparative Examples 1 to 9 obtained in the above-described manner and the thermal resistance after the formation were measured, and the difference was observed. Note that the thermal resistance was measured using TIM-Tester (manufactured by Analysis Tech Inc.) in accordance with ASTMD6470 at a measurement temperature of 50° C. and a pressure of 100 psi.

[Adhesion]

The adhesion of the thermal conductive composite silicone rubber sheets and the composite sheets were observed by the above-described method. That is, in accordance with JIS C 2107, the adhesive layer side of the thermal conductive composite silicone rubber sheet with a width of 25 mm was stuck to a stainless steel plate, and left at 25° C. for 30 minutes. The sheet was then delaminated at a pulling rate of 300 mm/min at 180°. The release force on this occasion was measured.

The measurement results are shown in Tables 1 and 2.

TABLE 1

| | Example | | | | | | | |
|---|---|---|---|---|---|---|---|---|
| | 1 | 2 | 3 | 4 | 5 | 6 | 7 | 8 |
| Thermal conductive silicone rubber sheet | 1 | 2 | 3 | 4 | 2 | 2 | 4 | 2 |
| Thermosoftening silicone resin layer | 1 | 1 | 1 | 2 | 1 | 1 | 2 | 3 |
| Thickness of thermosoftening silicone resin layer (μm) | 7 | 8 | 3 | 8 | 3 | 0.5 | 10 | 3 |
| Difference in thermal resistance (cm² · K/W) | 0.15 | 0.12 | 0.08 | 0.13 | 0.05 | 0.05 | 0.15 | 0.2 |
| Adhesion (N/25 mm) | 0.8 | 0.8 | 0.7 | 0.7 | 0.6 | 0.6 | 0.8 | 0.6 |

TABLE 2

| | Comparative Example | | | | | | | | |
|---|---|---|---|---|---|---|---|---|---|
| | 1 | 2 | 3 | 4 | 5 | 6 | 7 | 8 | 9 |
| Thermal conductive silicone rubber sheet | 1 | 2 | 2 | 4 | 4 | 2 | 2 | 2 | 4 |
| Adhesive layer | 1 | 1 | 1 | 2 | 2 | | | | |
| Resin layer | | | | | | 1 | | | |
| Thermosoftening silicone resin layer | | | | | | | | 1 | 2 |
| Thermal conductive silicone resin layer | | | | | | | 1 | | |
| Thickness (μm) | 18 | 18 | 2 | 30 | 2 | 5 | 10 | 0.4 | 11 |
| Difference in thermal resistance (cm² · K/W) | 0.8 | 0.78 | 0.21 | 0.9 | 0.2 | 0.2 | 0.15 | 0.2 | 0.5 |
| Adhesion (N/25 mm) | 0.5 | 0.7 | 0.02 | 1.5 | 0.2 | 0.04 | 0.3 | 0.3 | 0.8 |

The composite sheets having an addition-curable adhesive layer 1 laminated with a thickness of 18 μm as in Comparative Examples 1 and 2 had sufficient adhesion, but since there was no thermosoftening, the differences from the thermal conductive silicone rubber sheet in thermal resistance were 0.8 and 0.78 cm²·K/W, which are large. On the other hand, if the thickness of the adhesive layer 1 is made as thin as possible as in Comparative Example 3, the difference in thermal resistance becomes small, but adhesion becomes extremely low, and problems occur during mounting process when mounting in the interface between a heat-generating member and a cooling member. When a peroxide-curable adhesive layer 2 is used as in Comparative Example 4, too, high adhesion can be achieved if the thickness of the adhesive layer 2 is made thicker, but since there is no thermosoftening, the difference in thermal resistance becomes great. If the thickness of the adhesive layer 2 is made thinner as in Comparative Example 5, the difference in thermal resistance becomes small, but again, sufficient adhesion cannot be achieved. Meanwhile, when a thermosoftening resin layer having a viscosity at 70° C. of 700 Pa·s or higher was used as in Comparative Example 6, it was not possible to achieve sufficient adhesion. In addition, when a thermal conductive silicone resin layer is laminated on a thermal conductive silicone rubber sheet as in Comparative Example 7, the difference in thermal resistance becomes small but sufficient adhesion cannot be achieved. In addition, when the thermosoftening silicone resin layer is laminated on the thermal conductive silicone rubber sheet with a thickness of 0.4 μm, which is thinner than 0.5 μm, as in Comparative Example 8, the difference in thermal resistance becomes small, but sufficient adhesion cannot be achieved. Meanwhile, if 11 μm, which is thicker than 10 μm, of the thermosoftening silicone resin layer is laminated on the thermal conductive silicone rubber sheet as in Comparative Example 9, the difference in thermal resistance becomes large.

As described, the composite sheets of Comparative Examples 1 to 9 cause problems when mounting in the interface between a heat-generating member and a cooling member due to insufficient adhesion or by inhibiting the dissipation of the heat generated from the heat-generating member.

On the other hand, the thermal conductive composite silicone rubber sheets of Examples 1 to 8 were each provided with a thermosoftening silicone resin layer having a thickness of 0.5 to 10 μm and having a viscosity at 70° C. of 700 Pa·s or lower on at least one side of a thermal conductive silicone rubber sheet. The thermal conductive composite silicone rubber sheets had adhesion of 0.5 N/25 mm or higher in an environment of normal temperature, and the thermal conductive composite silicone rubber sheets each had a thermal resistance that was lower than a value obtained by adding 0.3 cm²·K/W per one layer of one side of the thermosoftening silicone resin layer to the thermal resistance of each thermal conductive silicone rubber sheet.

As described above, the inventive thermal conductive composite silicone rubber sheet has a thermosoftening silicone resin layer with an absolute viscosity at 70° C. of 700 Pa·s or lower provided with a thickness of 0.5 to 10 μm on at least one side of the thermal conductive silicone rubber sheet, has adhesion of 0.5 N/25 mm in an environment of normal temperature, and the thermal conductive composite silicone rubber sheet has a thermal resistance that is lower than a value obtained by adding 0.3 cm²·K/W per one layer of one side of the thermosoftening silicone resin layer to a thermal resistance of the thermal conductive silicone rubber sheet. The inventive thermal conductive composite silicone rubber sheet has sufficient adhesion required during a mounting process, and the difference between the thermal conductive silicone rubber sheet and the thermal conductive composite silicone rubber sheet in thermal resistance can be made small. Such a thermal conductive composite silicone rubber sheet has both thermal conductivity and adhesion sufficiently, and is therefore suitable when mounting between a heat-generating member, such as a semiconductor, and a cooling plate, such as a heat sink.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A thermal conductive composite silicone rubber sheet comprising a thermal conductive silicone rubber sheet and a thermosoftening silicone resin layer provided with a thickness of 0.5 to 10 μm on at least one side of the thermal conductive silicone rubber sheet, the thermosoftening silicone resin layer having an absolute viscosity at 70° C. of 700 Pa·s or lower, wherein
    the thermosoftening silicone resin layer has adhesion of 0.5 N/25 mm or higher at a normal temperature and contains no heat conductive filler, and
    the thermal conductive composite silicone rubber sheet has a thermal resistance that is lower than a value obtained by adding 0.3 cm²·K/W per one layer of one side of the thermosoftening silicone resin layer provided on at least one side of the thermal conductive silicone rubber sheet to a thermal resistance of the thermal conductive silicone rubber sheet wherein the thermal conductive silicone rubber sheet has a silicone rubber component comprising a dimethylsiloxane unit, and the thermosoftening silicone resin layer has a phenyl modification rate of greater than 20 mol %.

2. The thermal conductive composite silicone rubber sheet according to claim 1, wherein after keeping the thermal conductive composite silicone rubber sheet in storage in an environment of 60° C. for two months, the thermosoftening silicone resin layer has adhesion of 70% or more of the adhesion before the storage.

3. The thermal conductive composite silicone rubber sheet according to claim 2, wherein the thermal conductive silicone rubber sheet comprises a glass cloth and/or a plastic film.

4. The thermal conductive composite silicone rubber sheet according to claim 1, wherein the thermal conductive silicone rubber sheet comprises a glass cloth and/or a plastic film.

5. The thermal conductive composite silicone rubber sheet according to claim 1, wherein the absolute viscosity of the thermosoftening silicone resin layer at 70° C. is 200 Pa·s or lower and 700 Pa·s or lower.

6. The thermal conductive composite silicone rubber sheet according to claim 1, wherein the absolute viscosity of the thermosoftening silicone resin layer at 70° C. is 300 Pas or lower and 700 Pa·s or lower.

7. The thermal conductive composite silicone rubber sheet according to claim 1, wherein the adhesion of the thermosoftening silicone resin at a normal temperature is 0.6 N/25 mm or higher.

8. The thermal conductive composite silicone rubber sheet according to claim 1, wherein the adhesion of the thermosoftening silicone resin at a normal temperature is 0.7 N/25 mm or higher.

9. The thermal conductive composite silicone rubber sheet according to claim 1, wherein the thermal resistance of the thermal conductive composite silicone rubber sheet is equal to or lower than a value obtained by adding 0.15 $cm^2 \cdot K/W$ per one layer of one side of the thermosoftening silicone resin layer provided on at least one side of the thermal conductive silicone rubber sheet to the thermal resistance of the thermal conductive silicone rubber sheet.

\* \* \* \* \*